Aug. 20, 1968  D. J. ZEPPIERI  3,398,333
ELECTRICAL COMPONENT END SEAL
Filed Jan. 27, 1966
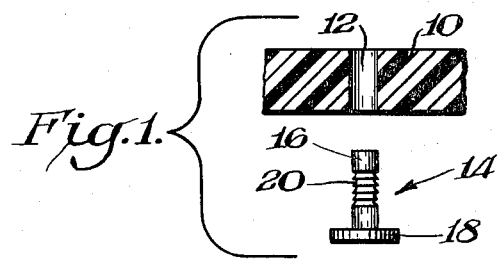
Fig.1.
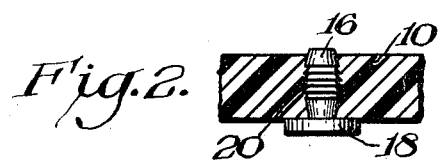
Fig.2.
Fig.3.
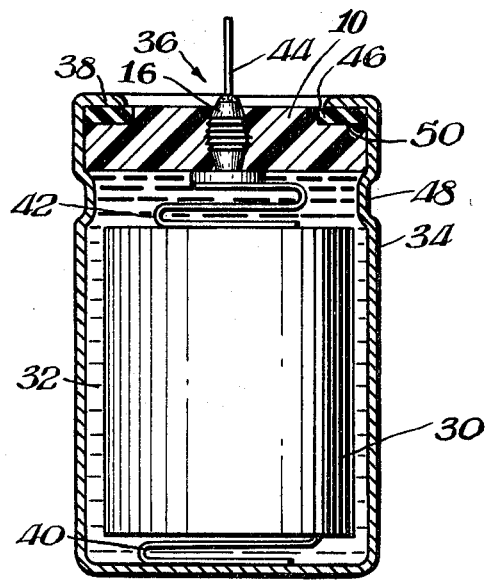

United States Patent Office 3,398,333
Patented Aug. 20, 1968

3,398,333
ELECTRICAL COMPONENT END SEAL
Dominick John Zeppieri, North Adams, Mass., assignor to Sprague Electric Company, North Adams, Mass., a corporation of Massachusetts
Filed Jan. 27, 1966, Ser. No. 523,432
5 Claims. (Cl. 317—230)

ABSTRACT OF THE DISCLOSURE

A terminal shaft, surrounded by an electrically insulating plug, includes a centrally located portion of enlarged diameter having a recess extended therearound, and the enlarged portion exerts a substantially radial pressure within the plug making it conform to the shaft and fill the recess.

---

The present invention relates to an end seal for electrical components and more particularly to an end seal for electrical capacitors and a method of making the same.

One difficulty in sealing capacitors and other electrical components is the construction of a suitable seal between the component lead or terminal and the insulator through which it extends. Generally, such seals are unsatisfactory unless an expensive glass to metal seal is employed.

One object of the present invention is to provide an economical and reliable end seal for electrical components.

Another object is to provide a reliable seal between a metal terminal and a plastic insulating plug.

A further object is to provide a method of making an economical and reliable seal between a metal terminal and a thermoplastic insulating plug.

A still further object is to provide an electrical capacitor having an economical and reliable end seal.

These and other objects will be apparent upon consideration of the following description taken in conjunction with the accompanying drawing in which:

FIGURE 1 is an exploded view partly in section of members which may be utilized in fabricating an end seal in accordance with the invention;

FIGURE 2 is a view partly in section of an end seal made in accordance with the invention; and FIGURE 3 is a view partly in section of an electrolytic capacitor utilizing the end seal illustrated in FIGURE 2.

Basically, an end seal produced in accordance with the invention comprises a metal terminal surrounded by a plug of thermoplastic material. The terminal has at least one recess therein and an enlarged diameter which exerts a substantially radial pressure within the plug, while the plug material conforms to the terminal in intimate contact with it and fills the recess.

Briefly, the process for making an end seal in accordance with the invention comprises the steps of inserting a metal terminal within a thermoplastic plug, and enlarging and heating the terminal to provide a radial pressure within the plug and to make the adjacent thermoplastic conform to the terminal.

More specifically, the process comprises the steps of inserting a flanged metal terminal having a plurality of circumferential anchor grooves within an aperture of a thermoplastic plug, heating the terminal by passing a current therethrough and exerting a pressure on each end thereof to enlarge the diameter of the terminal thereby providing a substantially radial force on the walls of the aperture and melting the thermoplastic adjacent the terminal making it conform to the terminal diameter and fill the anchor grooves.

An electrical capacitor provided in accordance with the invention comprises a container, a capacitance section within the container, at least one end of the container being closed by a thermoplastic plug which is sealed on its perimeter to the container, and through which a metal terminal extends. The terminal has at least one recess therein and an enlarged diameter which exerts a substantially radial pressure within the plug, while the thermoplastic plug material conforms to the terminal diameter in intimate contact with it and fills the recess. A lead connects one electrode of the capacitance section to the internal end of the terminal.

Referring now to the drawing and to FIGURE 1 in particular wherein is shown an insulating plug 10, having an aperture 12, positioned over a flanged metal terminal 14 which includes a cylindrical shaft 16 and a flange 18.

The diameter of shaft 16 is made a close fit to aperture 12 whereas the shaft length is made to exceed the thickness of spacer 10, allowing it to extend through the latter. A plurality of recesses, such as circumferential grooves 20, are provided along shaft 16 to help anchor the terminal in plug 12 and to increase the leakage path along terminal 14. Various recesses such as grooves or dimples may be suitable, however, a continuous path through the plug should be avoided. Thus, a recess in the form of a helix, or axial slots, should be confined within the plug material to avoid a leakage path.

Terminal 14 is anchored or sealed in plug 10, as shown in FIGURE 2, by a hot upsetting technique, such as by inserting shaft 16 within aperture 12 with flange 18 seated against one surface of the plug 10 and thereafter applying pressure across the ends of shaft 16 while heating it to enlarge the diameter and melt the contacting or adjacent thermoplastic. Thus, the terminal is expanded within the plug, exerting substantially radial pressure thereon and the plastic melted to make it conform to shaft 16 and fill grooves 20. This is conveniently accomplished, for example, by means of a resistance welder. Thus, the welding electrodes are placed in contact with the ends of shaft 16, a force applied and sufficient current passed through to heat the center of shaft 16 thereby expanding it and melting the adjacent plastic.

Flange 18 is seated against one surface of plug 10 to correctly position terminal 14 in plug 10, and to increase the leakage path of the seal. Obviously, the height of shaft 16, which originally exceeds that of plug 10, is shortened during the sealing operation. Thus, grooves 20 become narrower as well as expanded in diameter, and enhance the sealing characteristics. It should also be noted, that grooves 20 increase the electrical resistance of shaft 16 in this area thereby concentrating the heat, and in addition, provide a mechanically weakened area to insure expansion of the central portion of shaft 16.

Various thermoplastic materials, herein defined as plastic materials characterized by having the property of softening under heat and pressure and being capable of resoftening, such as polyamides, polypropylene, polyethylene and copolymers of them are suitable. However, a polyamide, such as nylon 6/6, is preferred since it provides satisfactory rigidity with relatively low temperature softening characteristics. Other thermoplastics, such as polytetrafluoroethylene are also suitable but it should be understood that materials having very low rigidity, while still providing a low leakage path, may not provide sufficient resistance to forces tending to drive the terminal from the plastic.

The hot upsetting technique described above provides a melting or flow, due to heat and pressure, of only the plug material adjacent the shaft. Thus, material at a small radial distance from the shaft is not effected and generally resists the terminal expansion, thereby forcing the molten plastic tightly around shaft 16 and within grooves 20 to provide a tighter seal than that possible by other means such as, for example, by molding the plastic around the shaft 16. The enlarged diameter of shaft 16 also continues to exert a substantially radial force on the surrounding plug.

The described seal may be produced with various metal terminals, although the pressure and temperature of the hot upsetting will vary in each case. Aluminum or other valve-metal is, for example, preferred for use with electrolytic capacitors. Furthermore, although a cylindrical shaft and flange is preferred, various shapes may be suitable.

As indicated, a close or press fit between the original terminal diameter and aperture is preferred. Obviously, a loose fit, for example, more than 1/64 inch clearance would require an unnecessary amount of terminal expansion to provide a suitable seal. Thus, for example, excellent seals were made in a .120" aperture in a nylon 6/6 plug with an aluminum terminal having an original shaft diameter of .120". The shaft, whose height was .355", was lightly pressed within the plug and deformed, as indicated, by means of a resistance welder. The final height of the shaft was .318" which provided a short extension of the shaft above the .290" thick plug. Five circumferential grooves, approximately .020" deep were provided along the center portion of the shaft to increase the leakage path and secure the terminal.

A cylindrical plug, as hereinafter described in respect to FIGURE 3, was employed in the above example, however, since the plug may be sealed within a container in any number of ways, the invention is not to be restricted to cylindrical plugs but may, of course, be employed with plugs of various shapes.

In FIGURE 3, a capacitor section 30 is shown immersed in an electrolyte 32 within a container 34. The container 34 is closed at the top by a seal 36 made in accordance with the invention. Accordingly, a cylindrical plug 10 of polypropylene or the like is provided with a metal terminal shaft 16 of aluminum or other valve-metal, which extends through and is sealed to the plug in the manner described.

Plug 10 is supported at one end of container 34 by a circumferential indent 48. A resilient washer 46 of rubber or the like, which is carried in a recess 50 at the upper edge of plug 10, is employed with a rolled edge 38 of container 34 to provide a peripheral seal.

One electrode of section 30 is connected to container 34 by tab 40 while the other is connected to terminal shaft 16 by tab 42, and an extended lead 44 is butt welded to the exposed end of shaft 16 to complete the capacitor. In a similar manner, a seal could also be provided at the other end of container 34 for feed through capacitors, or the like.

Furthermore many modifications of this invention may be made without departing from the spirit and scope hereof and it is to be understood that the invention is not to be limited except as defined in the appended claims.

What is claimed is:

1. An end seal for electrical components comprising a metal terminal having a shaft, and an electrically insulating plug of thermoplastic material surrounding said shaft, said shaft having a portion of enlarged diameter substantially centrally located within said plug and at least one recess extended around said portion, said enlarged diameter portion exerting a substantially radial pressure within said plug, and said plug conforming to said shaft in intimate pressure contact thereto and substantially filling said recess.

2. An end seal as claimed in claim 1 wherein said terminal carries a flange at one end in intimate contact with one surface of said plug.

3. An end seal as claimed in claim 1 wherein said thermoplastic material is a member of the group consisting of a polyamide, polypropylene, polyethylene, and copolymers thereof.

4. An end seal as claimed in claim 3 wherein said terminal is a valve-metal.

5. An electrical capacitor comprising a container, a capactive section having a valve-metal electrode and an electrolyte within said container, at least one end of said container being closed by an electrically insulating plug of thermoplastic material, said plug sealed to said container and having a valve-metal terminal extending therethrough, said terminal having a portion of enlarged diameter substantially centrally located within said plug and at least one recess extended around said portion, said enlarged diameter exerting a substantially radial pressure within said plug, said plug conforming to said terminal in intimate pressure contact thereto and filling said recess, and said valve-metal electrode in electrical connection to said terminal.

References Cited

UNITED STATES PATENTS

| | | | |
|---|---|---|---|
| 3,114,085 | 12/1963 | Ruscetta et al. | 317—230 |
| 3,174,085 | 3/1965 | Schroeder et al. | 317—230 |
| 3,341,751 | 9/1967 | Clement | 317—230 |

JAMES D. KALLAM, *Primary Examiner.*